May 28, 1940.  C. W. BLOUNT  2,202,042
METHOD OF MANUFACTURING HOLLOW OBJECTS
Filed Jan. 13, 1932  2 Sheets-Sheet 1
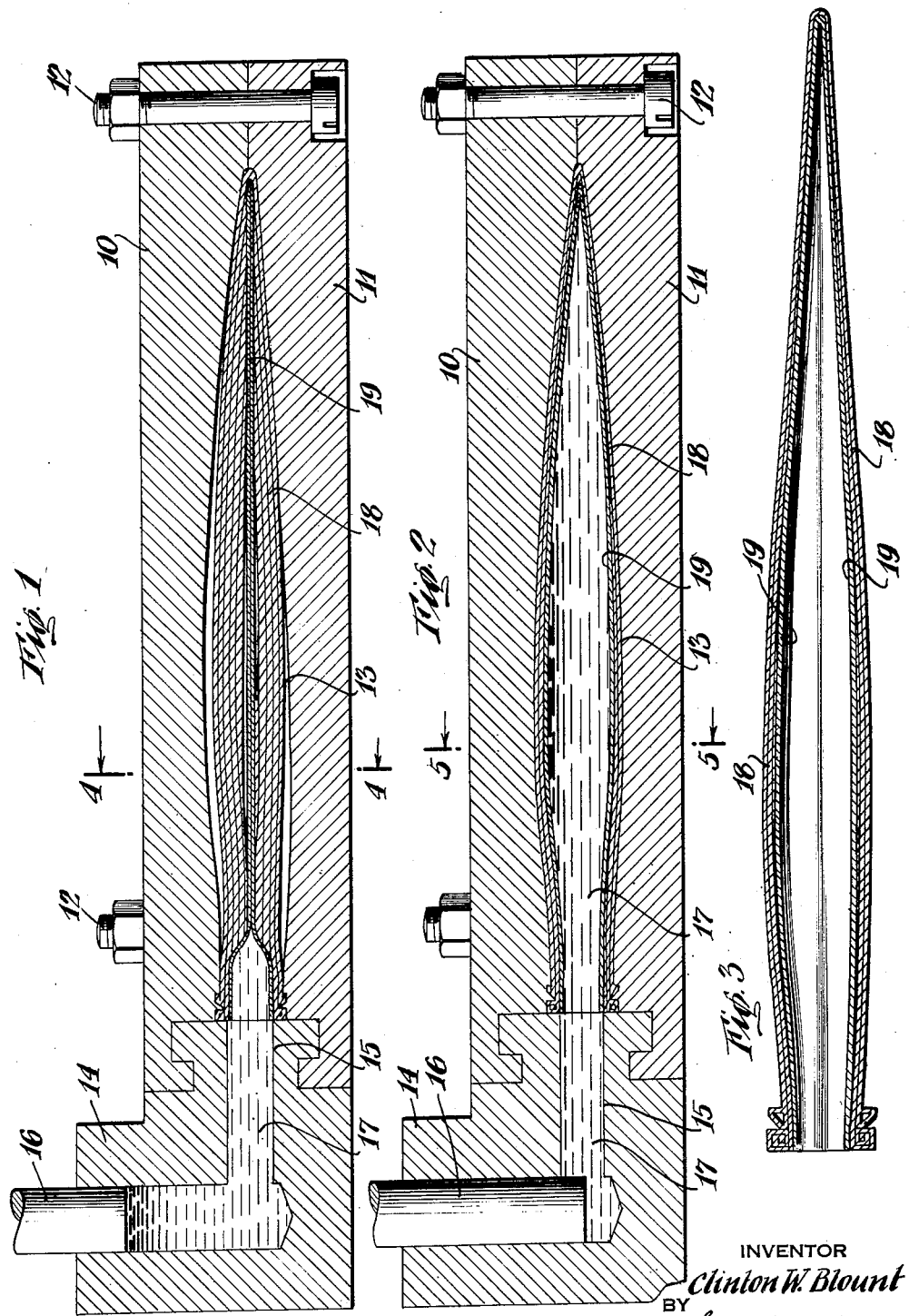
INVENTOR
Clinton W. Blount
BY
Alan N. Mann
ATTORNEY

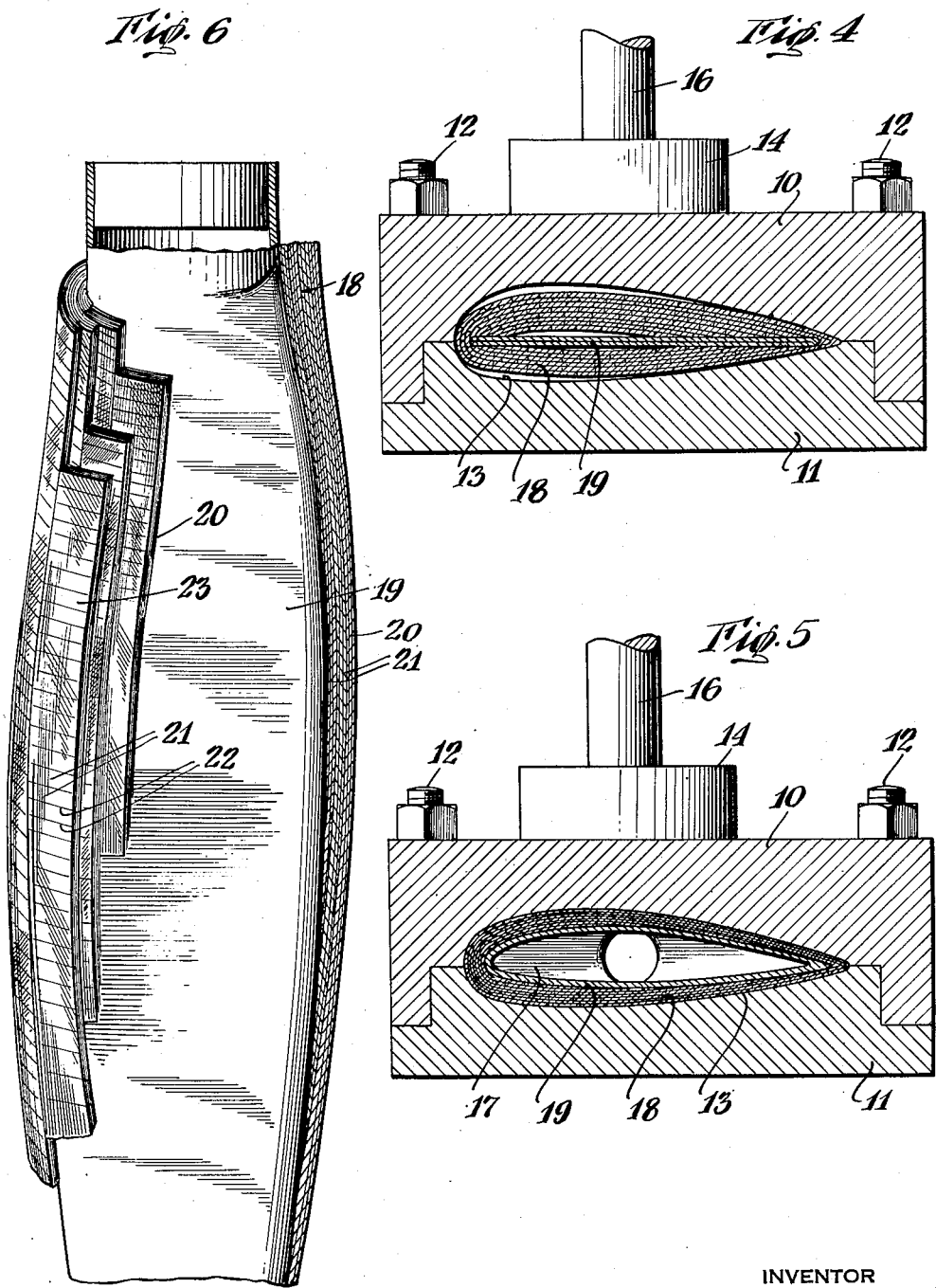

Patented May 28, 1940

2,202,042

UNITED STATES PATENT OFFICE 2,202,042

METHOD OF MANUFACTURING HOLLOW OBJECTS

Clinton W. Blount, Upper Montclair, N. J.

Application January 13, 1938, Serial No. 184,799

6 Claims. (Cl. 18—55)

My invention relates to the manufacture of hollow objects, including a method for making hollow air-propeller blades.

The large majority of air propeller blades that have been put into commercial use are solid blades made either of a light metal such as aluminum or of wood. Attempts have been made heretofore to manufacture hollow blades from sheet steel by forming the blade from two separate pieces of sheet steel and fastening the two sheets together by welding or otherwise along the joined edges. These attempts have not proven commercially satisfactory since the blades so formed have a tendency to separate along the joined edges under the stresses imposed by the exceedingly high speeds of present aircraft motors.

An object of my invention is to provide method for forming hollow objects such as hollow reinforced air propeller blades.

In accordance with my invention I have discovered a method of making hollow plastic articles, such for example as air propeller blades. The method comprises, generally, placing an expansible form in a mold, loosely packing reinforced plastic material around this form and injecting molten metal under pressure into this form. The metal transmits sufficient pressure to the form to expand it to the desired size and thereby compress the surrounding reinforced plastic material against the mold so as to form the hollow article, which is cured or set, the metal being at a temperature correct to polymerize or soften the plastic material without damaging it. This temperature is usually well above the melting point of the metal. When the molding operation is complete the metal is then withdrawn from the blade form by heating (or keeping it heated) to barely above its melting point. The blade form is then removed from the blade proper unless it is of a type intended to become a permanent part of the blade.

A reinforced plastic material suitable for forming the hollow air propeller blades of this invention is disclosed in a copending application, Serial No. 184,797 filed January 13, 1938. It will be understood, however that broadly the present method of forming hollow air propeller blades and other hollow objects is not dependent upon the use of any specific type of reinforcing material which is to form ultimately the body of the hollow object. When the plastic material used is of the thermoplastic type, and the blades have been formed, heating of the injected metal to effect its removal should be so controlled that the formed plastic will not soften. However, when thermosetting types of plastics are used heating of the metal to a temperature higher than the polymerizing temperature of the plastic will not harm the latter once it has set.

The novel features of my invention are set forth with particularity in the appended claims. The invention itself both as to organization and method of operation will be clearly understood from the following description taken in conjunction with the accompanying drawings, in which:

Fig. 1 is a longitudinal sectional view of a mold with enclosed air propeller blade form and reinforced plastic material before injection of the molten metal;

Fig. 2 is a longitudinal sectional view of the mold and air propeller blade form of Fig. 1 after the blade form has been expanded by injection of the molten metal;

Fig. 3 is a longitudinal sectional view of the hollow air propeller blade made by the procedure indicated in Figs. 1 and 2;

Fig. 4 is a cross-sectional view taken along line 4—4 of Fig. 1 showing the mold, and blade form before expansion;

Fig. 5 is a cross-sectional view taken along line 5—5 of Fig. 2 showing the blade form after expansion; and Fig. 6 is a perspective view of a portion of the completed air propeller blade showing the reinforced material.

Referring now to the several figures in the drawings and at first to Figs. 1 and 4, the mold comprises two halves 10 and 11 which are joined together by means of bolt and nut assemblies 12, and which two mold halves have inner concave surfaces which form the mold cavity 13 and at one end they clamp over the mold extension 14 having an L-shaped channel 15 formed therein. This channel connects with the mold cavity 13 at one of its ends and is closed at the other end by means of a plunger 16. The L-shaped channel 15 in accordance with this invention is filled with molten metal indicated at 17.

The reinforced plastic material which is to form the body of the air propeller blade is shown generally at 18. This material may consist of a large number of laminations of plastic coated wire braid such as disclosed in the above copending application and shown generally in Fig. 6. The expansible form which is used for forming the air propeller blade is indicated at 19. This form may be made of any suitable material which will be readily expanded by injection of the molten metal under pressure as described above. Examples of suitable forms are a rubber bag and a thin metal bag, the word bag being used here in a generic sense and not limited to any specific form or shape.

In the example shown in Figs. 1 and 4, the expansible bag or blade form 19 is placed in the mold and the plastic coated braid or other material of which the air propeller blade is to be formed is arranged around the form 19 in the mold cavity. As indicated in Figs. 1 and 4 the mold cavity is not completely filled with the blade material 18 since only a shell of a blade is to be made according to this method. However, because of the compressibility of this material the mold cavity may be completely but loosely filled with the material 19 surrounding the blade form 18.

The method of forming the air propeller blade is indicated in Figs. 2 and 5. Referring to those two figures it will be noted that the compression plunger 16 has been lowered in the L-shaped channel 15 and the pressure applied thereby on the molten metal 17 has caused it to flow into the blade form 19 expanding the latter to the desired size shown in Figs. 2 and 5. The expanded blade form 19 under pressure of the molten metal 17 has now pressed the blade material 18 against the enclosing walls of the mold cavity 13 so as to form a shell of the desired blade.

The molten metal is heated to a temperature sufficient to cure the plastic in the blade material. A suitable temperature for a phenol formaldehyde resin is about 325° F. The blade material 18 when subjected to this temperature will polymerize, that is set or harden in the desired form.

After the plastic material has been compressed and cured the molten metal 17 is now withdrawn from the blade form 19. If a sufficient period of time has elapsed for the molten metal to harden in the blade form the blade is heated just sufficiently to melt the metal again so that it may be poured out or otherwise withdrawn from the blade form. If the blade form 19 is of the type intended to become a permanent part of the blade such as for example a thin metal bag, it remains as a part of the blade. However, if the form is of the type intended to be removed such as for example a rubber bag the bag is now withdrawn from the formed blade after the molten metal has been removed.

In Fig. 3 the final hollow air propeller blade is shown. This blade is of the type produced according to the procedures described above in connection with Figs. 1 and 2. In the type of blade shown in Fig. 3 the blade form 19 has not been removed but remains as a permanent part of the blade. As a result of the temperature and pressure treatments described above in connection with Fig. 2 the form 19 has been attached firmly and in effect made an integral part of the main body of the blade 18. It will be understood that when the removable type of blade form such as a rubber bag is used the final blade will consist of only the blade shell 18 which has been compressed and heated into a solid, extremely strong rigid form by the molding process described above in connection with Fig. 2.

The preferred type of blade material, which forms the blade shell 18 in the final product, is a wire-organic fiber braid coated with a plastic material such as phenol formaldehyde resin. This reinforced material forms the subject matter of the copending application identified above and is not claimed per se in the present application. An example of this form of material is shown in Fig. 6 by way of illustration only. It consists of primarily a tape, braid, web, or fabric 20 made up of a large number of fine steel wires 21 which are held in place by the organic fiber threads 22. This material is impregnated and coated with a synthetic resin or other suitable plastic 23. This plastic coating is applied in lacquer form and may be unpolymerized at the time this reinforced material is placed in the mold shown in Fig. 2 to form the blade material 18. The heat and pressure employed in the molding operation described above are sufficient to effect polymerization of the plastic material thereby causing it to harden into a solid rigid mass which eventually forms either the entire blade body or a principal portion thereof.

In an alternative arrangement instead of using a separate bag or the like as a form for the reinforced plastic material, this material itself may be used to receive the molten metal. For this purpose the reinforced plastic braid or web may be wound around a removable mandrel of proper size and shape to form the braid or web into a tubular shaped member. Upon removing the mandrel this tubular member is ready for use in the mold wherein the molten metal would be injected into the tube and effect compression of the material into the desired form.

It will be understood that the hollow objects produced in accordance with the method of this invention may be converted into solid objects such as for example solid air propeller blades by injecting any suitable material such as for example additional similar or different plastic into the cavity of the hollow object, permitting it to harden therein and form a solid core. In addition to air propeller blades various forms of hollow objects such as for example, vases and pitchers may be made by the general procedure described hereinabove.

Various modifications and changes may be made in the materials, apparatus and procedures described hereinbefore without departing from the scope of my invention.

I claim:

1. A method of forming hollow objects by the application of heat and pressure to a moldable material arranged in a mold, without preforming the material around a fixed core, comprising placing in a mold cavity a random mass of moldable material and a hollow collapsed, expansible, object former of substantially bag-like form so that said bag-like member is substantially covered by said mass of moldable material, injecting into said hollow bag-like member molten metal at a temperature and pressure sufficient to expand said former to the desired form and compress and heat said moldable material to a shell form having the general shape of the mold cavity and removing said molten metal.

2. A method of forming hollow objects as defined in claim 1 in which the expansible member is a thin-wall metal bag.

3. A method of forming hollow objects as defined in claim 1 in which the object formed is a hollow air propeller blade.

4. A method of forming hollow objects as defined in claim 1 in which the moldable material is reinforced plastic.

5. A method as defined in claim 1 in which the object former after being expanded and after compressing the moldable material into the desired form, is removed from the hollow object.

6. A method of forming hollow objects as defined in claim 1 in which the moldable material comprises strips or sheets of wire braid filled and coated with a thermosetting phenol formaldehyde resin that hardens under the said heat and pressure conditions to a permanently insoluble and infusible form.

CLINTON W. BLOUNT.